United States Patent [19]

Judas et al.

[11] Patent Number: 5,574,128
[45] Date of Patent: Nov. 12, 1996

[54] POLYMERS COMPRISING BOTH POLYAMIDE-DIACID/POLYETHERDIOL BLOCKS AND POLYAMIDE-DIACID/POLYETHERDIAMINE BLOCKS, AND THEIR PREPARATION

[75] Inventors: Didier Judas, Paris; Jean-Marc Sage, Oullins, both of France

[73] Assignee: Elf Atochem S.A., France

[21] Appl. No.: 288,531

[22] Filed: Aug. 10, 1994

[30] Foreign Application Priority Data

Aug. 20, 1993 [FR] France ................................ 93 10140

[51] Int. Cl.$^6$ .......................... C08G 69/44; C08L 77/12
[52] U.S. Cl. ...................... 528/288; 528/272; 528/274; 528/292; 528/310; 528/318; 528/323; 528/326; 528/332; 528/336; 525/411; 525/420; 525/926; 525/927
[58] Field of Search ............................. 528/288, 274, 528/272, 289, 292, 332, 323, 336, 326, 318, 310; 525/411, 420, 519, 926, 927

[56] References Cited

U.S. PATENT DOCUMENTS

| | | | |
|---|---|---|---|
| 4,345,052 | 8/1982 | Mumcu et al. | 525/411 |
| 4,345,064 | 8/1982 | Mumcu | 528/288 |
| 4,349,661 | 9/1982 | Mumcu | 528/288 |
| 4,361,680 | 11/1982 | Borg et al. | 525/420 |

*Primary Examiner*—P. Hampton-Hightower
*Attorney, Agent, or Firm*—Pennie & Edmonds

[57] ABSTRACT

Polyetheresteramides, characterized in that they comprise both of the following repeating entities:

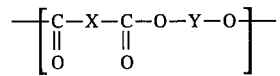

A

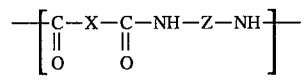

B in which X represents the residue of a polyamide-diacid oligomer with an Mn of between 300 and 8000, Y represents the residue of a polyetherdiol with an Mn of between 200 and 5000, and Z represents the residue of a polyetherdiamine with an Mn of between 200 and 5000, wherein the proportion by mass of the entities Z resulting from the condensation of the polyetherdiamine with respect to the total amount of the entities resulting from the polyetherdiol and polyetherdiamine, i.e. Z/(Z+Y), is between 1 and 50%. The polyetheresteramides according to the invention can be used as is and are suitable for the production of mouldings, extrudates, films, sheaths, or composite materials such as multi-layer film. They can also be mixed with other polymers and in particular with polyamides. Additives such as heat stabilizers, antioxidizing agents, dyes, inorganic fillers, or various organics can also be added to them.

26 Claims, 2 Drawing Sheets

POLYMERS COMPRISING BOTH POLYAMIDE-DIACID/POLYETHERDIOL BLOCKS AND POLYAMIDE-DIACID/POLYETHERDIAMINE BLOCKS, AND THEIR PREPARATION

FIELD OF THE INVENTION

The present invention relates to block copolymers that may be referred to as polyetheresteramides. The block copolymers according to the present invention comprise both polyether blocks and polyamide blocks.

BACKGROUND OF THE INVENTION

Polyetheresteramides are known, for example as obtained according to French Patents Nos. 2,273,021 and 2,401,947. These polymers are obtained by reaction, in the molten state, of a polyamide-diacid oligomer with a polyetherdiol oligomer under high vacuum in the present of metal catalysts.

A description is given, in French Patent No. 2,384,810, of polyetheresteramides obtained by polymerization, under autogenous pressure, at temperatures between 230° and 300° C., of a mixture consisting: of one or a number of polyamide monomers; of a polyetherdiol oligomer; and of at least one diacid in the presence of water.

A description is given, in Japanese Patent 7,007,559, of polymers containing polyether and polyamide blocks obtained by reaction of a polyamide-diacid oligomer with a polyetherdiamine oligomer in the molten state.

A description is given, in U.S. Pat. Nos. 4,345,064, 4,349,661, and 4,345,052, of processes for preparing polyetherdiols and polyetherdiamines, and of the synthesis of polyetheresteramides obtained from polyamide monomers, diacids, and either a polyetherdiol oligomer or else a polyetherdiamine oligomer.

Although the use of a mixture of polyetherdiamine and polyetherdiol may be generically covered by the disclosure of these patents, no advantage specific to the simultaneous use of these two constituents is mentioned and, likewise, no example of a polyetheresteramide containing both units resulting from a polyetherdiol oligomer and units resulting from a polyetherdiamine oligomer is given.

SUMMARY OF THE INVENTION

The polyetheresteramides according to the invention comprise the following repeating entities:

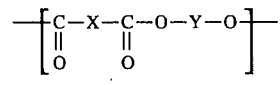  A

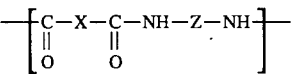  B in which:

X represents the residue of a polyamide-diacid oligomer with an Mn of between 300 and 8000, Y represents the residue of a polyetherdiol with an Mn of between 200 and 5000, and Z represents the residue of a polyetherdiamine with an Mn of between 200 and 5000.

It is known that polyether oligomers are sensitive to thermal degradation and very particularly in the temperature range commonly used for the synthesis of copolyetheresteramides, that is to say between 200° and 400° C. (*Journal of Polymer Science*, Vol. XXXVI, p. 183–194, 1959 by S. L. Madorsky and S. Strauss).

It is therefore very advantageous to be able to obtain polyetheresteramides in which the reaction of the polyamide-diacid oligomers and of the polyether oligomers composing these polymers leads to reduced polycondensation times, in order to avoid the degradation reactions of the polyetherdiols or polyetherdiamines, these degradation reactions bringing about a colouring of the products and restricting the molecular masses obtained. The polymers of the invention have sufficiently high molar masses to show good mechanical properties.

The polymers of the invention contain very few degradation products and therefore they do not exude. The degradation products remaining in the polymer can be measured by extracting the methanol.

Thus, for example, it is difficult to obtain polyetheresteramides resulting from the condensation of polypropylene glycol oligomers due to their low reactivity and to their sensitivity to thermal degradation (G. Dellens, P. Foy, E. Marechal, *European Polymer Journal*, Vol. 13, p. 343–351).

It has now been found that the specific and novel composition of the copolyetheresteramides according to the invention made it possible to very substantially reduce the reaction times necessary in order to obtain a high molecular weight polymer. The reduction in this polycondensation time makes it possible to limit the degradation reactions of the polyether oligomers or segments which form part of the composition of the polyetheresteramides obtained according to processes which are known and already mentioned, such as, for example, in Patents FR 2,273,021 or FR 2,401,947.

DETAILED DESCRIPTION OF THE INVENTION

Figure 1:
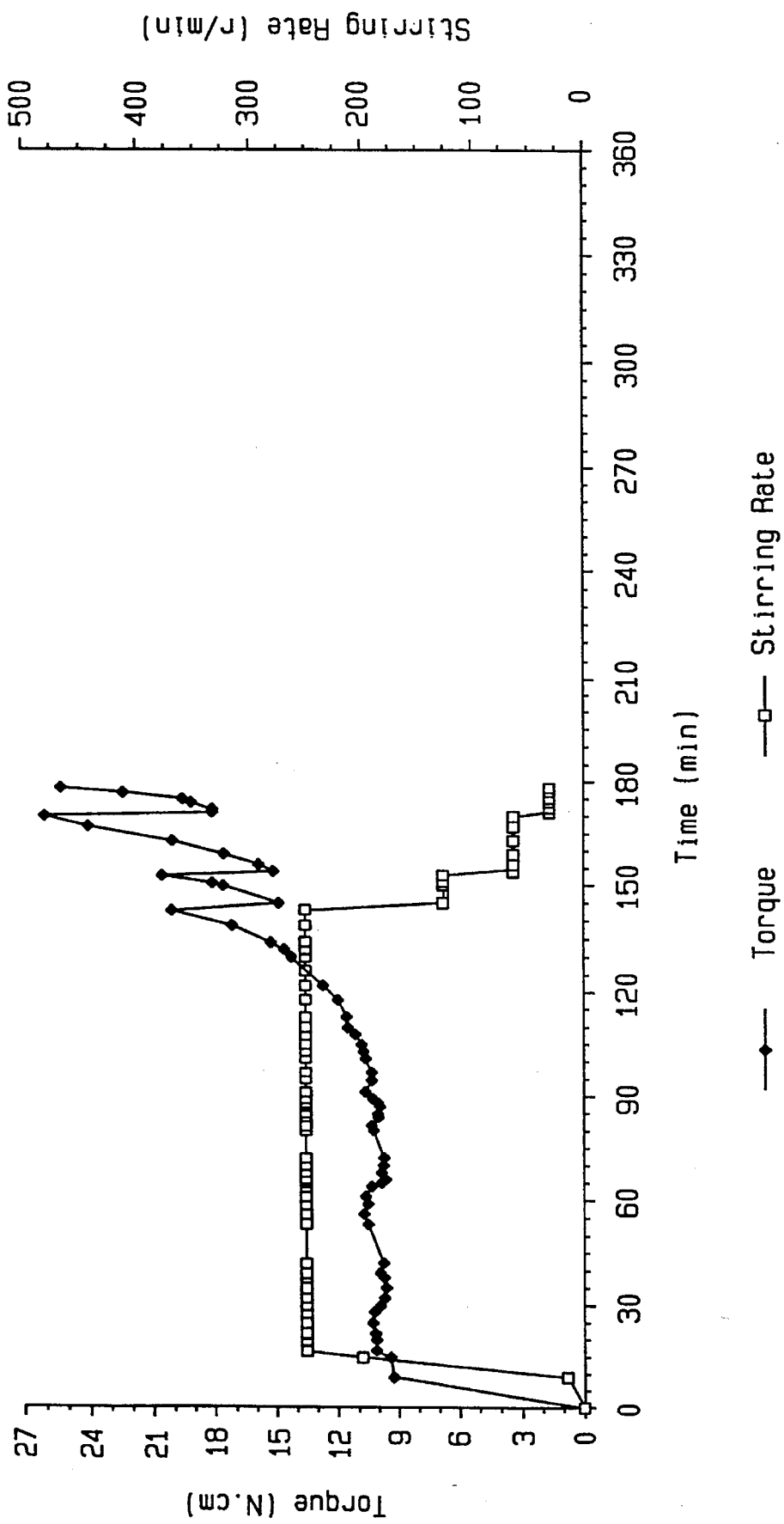
FIG. 1 is a plot of the development in torque and stirring rate as a function of the duration of reaction for an example in accordance with the present invention.

The polyetheresteramides according to the invention comprise both of the following repeating entities:

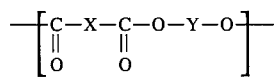  A

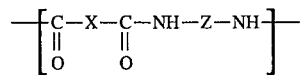  B in which:

X represents the residue of a polyamide-diacid oligomer with an Mn of between 300 and 8000 and preferably between 500 and 5000, Y represents the residue of a polyetherdiol with an Mn of between 200 and 5000 and preferably between 200 and 3000, and Z represents the residue of a polyetherdiamine with an Mn of between 200 and 5000 and preferably between 200 and 3000.

The polyamide-diacid oligomer has, from the nature of the polycondensation reactions whereby it may be obtained, a statistical distribution in its composition and in its polydispersity and is composed of polyamide-forming units resulting from the polycondensation of lactams or amino acids, for instance, caprolactam or dodecalactam, of diacid/ diamine pairs, for instance, hexamethylenediamine and adipic acid, or of a mixture of these units in the presence of a diacid chain-limiting agent. Lactams and/or amino acids and optionally up to 50 weight % of one or a number of diacids and of one or a number of diamines can also be polymerized in the presence of a diacid chain-limiter.

Mention will very particularly be made, among diacid chain-limiters, of adipic/terephthalic acids and dodecanedioic acid.

Mention may be made, as examples of polyetherdiols, of polyethylene glycol (PEG), polypropylene glycol (PPG), polytetramethylene glycol (PTMG) and the mixture of these polyetherdiols.

Mention may be made, as examples of polyetherdiamines, of the polyetherdiamines obtained by modification of the poletherdiols mentioned above. These chemical modifications can consist, for example, in the conversion of the end hydroxyl group of the polyether to an amine group by amination reactions or else in the conversion of the end hydroxyl group of the polyetherdiols, by cyaneothylation and then reduction, to the 3-aminopropyl ether group of formula —O—CH$_2$—CH$_2$—CH$_2$—NH$_2$.

The proportion by mass of the entities Z resulting from the condensation of the polyetherdiamine with respect to the total amount of the entities resulting from the polyetherdiol and polyetherdiamine, i.e. Z/(Z+Y), is advantageously between 1 and 50% and preferably between 5 and 30% and preferably between 10 and 20%.

The proportion by mass of polyamide-diacid oligomer can be between 10 and 99%, preferably between 20 and 95% and preferably between 40 and 90% with respect to the polymer.

The polyetheresteramides according to the invention can be prepared by reaction, in the molten state, between a polyamide-diacid oligomer A, a polyetherdiol oligomer B and a polyetherdiamine oligomer C, the relative proportions of the polyamide-diacid oligomer A and the polyether oligomers B and C observing the relationship:

$$0.85 < COOH/(OH+NH_2) < 1.15$$

preferably $$0.95 < COOH/(OH+NH_2) < 1.05$$

COOH representing the molar concentration of the carboxyl groups resulting from the polyamide-diacid oligomer, OH representing the molar concentration of the hydroxyl groups resulting from the polyetherdiol oligomer, NH$_2$ representing the molar concentration of the amine groups resulting from the polyetherdiamine oligomer.

The reaction is generally carried out under reduced pressure in the presence of at least one esterification catalyst such as, for example, aluminum, tin, antimony, germanium, zirconium and titanium alkoxides, antimony oxide or time hydroxyoxide laurate, alone or as a mixture, and/or in the presence especially of phosphoric acid. The addition of the catalyst can be carried out in one or a number of stages with optionally different catalysts according to the time of introduction during the process.

The usual reaction temperatures are between 200° and 400° C. and preferably between 200° and 300° C., preferably between 220° and 270° C.

A variant of the process consists in reacting all the polyether and polyamide constituents together, that is to say, the polyetherdiol oligomer, the polyetherdiamine oligomer, the monomers forming the polyamide unit, that is to say, the lactams, amino acids, diacids and diamines, and the chain-limiting diacid.

In this case, a first stage can be carried out at a pressure of 1 to 50 bars and temperatures of 200° to 400° C., preferably of 220° and 270° C., in order especially to open the lactam components forming the polyamide unit.

The polyetheresteramides according to the invention can be used as is and are suitable for the production of mouldings, extrudates, films, sheaths, or composite materials such as multi-layer film. They can also be mixed with other polymers and in particular with polyamides. Additives such as heat stabilizers, antioxidizing agents, dyes, inorganic fillers, or various organics can also be added to them.

EXAMPLES

The following examples illustrates the invention without limiting it in any way.

The inherent viscosities are determined at 0.5 g/dl in meta-cresol at 25° C. They are expressed in dl/g.

The melting temperatures are measured between 20° and 250° C. on the second heating with a DSC-4 device from the Company Perkin-Elmer.

The beginning of the rise in viscosity of the polymer during the synthesis reaction is determined by the clear-cut rise in the torque transmitted to the shaft of the stirrer or else by the increase in the power transmitted to the stirrer shaft at a constant rate of rotation.

Example 1

33.81 g of a PA 6 diacid oligomer with an Mn of 2300 and composed of units resulting from caprolactam and the dodecanedioc acid chain-limiter, 8.1 g of a polypropylene glycol polyether oligomer with an Mn equal to 600 (Pluriol P 600 from the company (BASF), 0.9 g of a polyoxypropylenediamine oligomer with an Mn of 2000 (JEFFAMINE D 2000 from the company Texaco), i.e. 10 mass % with respect to the polyether phase, 0.34 g of catalyst Zr(OBu)$_4$, i.e. 0.79 mass % with respect to the total charge, and 0.064 g of Irganox 1010 (antioxidizing agent from the company Ciba-Geigy), i.e. 0.15 weight % with respect to the total charge in the reactor, are introduced into a 300 cm$^3$ glass reactor provided with a nitrogen inlet and provided with an anchor-type stirrer equipped with a mechanical stirrer motor which makes it possible to measure the torque. The reactor, under nitrogen, is immersed in an oil bath held at 240° C. and stirring is begun at 250 revolutions/minute. The reactor is then progressively placed under vacuum until a vacuum of 0.5 mm Hg is reached and the development in the torque is then observed. The time from which a clear-cut increase in the torque is observed is recorded, that is to say 60 min (recorded as T1 in Table 1) and the reaction is continued for a further 3 hours. The polymer obtained has an inherent viscosity of 1.01 and a melting temperature of 208° C.

Examples 2 to 4

The reaction is carried out in the same way as in Example 1 with the same polyether or polyamide oligomers and with percentages by mass (with respect to the polyetherdiamine and polyetherdiol mass) of PPG diamine shown in Table 1, having regard for the molar concentrations of the functional ends of the oligomers involved satisfying the relationship COOH/(OH+NH$_2$)=0.95. The times T1 at which the viscosity of the polymer is observed to rise are reported in Table 1.

Comparative Examples 5 and 6

The reactions are carried out identically to Examples 1 to 4. The proportions are shown in Table 1.

Example 7

1209.7 g of the PA 6 diacid oligomer used in the preceding examples, 232.3 g of polyoxypropylene glycol with an Mn of 600, 58.1 g of polyoxypropylene-diamine with an Mn of 400 (JEFFAMINE D 400 from the company Texaco) and 2.25 g (i.e. 0.15%) of antioxidizing agent Irganox 1010 are introduced into a 6 l stainless steal autoclave. The reactor is maintained under nitrogen and brought to the reaction temperature, i.e. 240° C., over a half-hour with stirring (60 revolutions/minute). The reactor is then placed under vacuum until a pressure of 0.5 mm Hg is reached and 12 g of catalyst $Zr(OBu)_4$ are introduced. The rise is viscosity of the polymer is observed, at the end of 30 minutes after placing under vacuum, through the electrical power transmitted to the stirrer shaft. The development in the torque is then monitored while reducing the stirring to 10 revolutions/minute. The reaction is halted 30 minutes later and the power displayed at 10 revolutions/minutes is recorded at 20% (in % of an arbitrary scale taken as reference). The reactor is then again placed under nitrogen at atmospheric pressure and the polymer is extruded.

Comparative Example 8

The reaction is carried out in the same way as in Example 7 with the following charges: 795.5 g of the PA 6 diacid oligomer, 210.35 g of the polyoxypropylene glycol oligomer, 8 g of catalyst $(ZR(OBu)_4)$ and 1.5 g of antioxidizing agent Irganox 1010.

The beginning of the rise in viscosity of the polymer is only observed at the end of the 100 minutes after placing the reactor under vacuum and 110 minutes after this beginning of the rise in viscosity, only a value of 10% of the power is displayed at 10 revolutions/minute is obtained. The reaction is then halted because no further significant development is recorded.

Table 1 details the nature of Examples 1 to 8.

total polyether charge, and 0.25 g of catalyst $Zr(OBu)_4$, i.e. 0.5 mass % with respect to the total charge, are introduced into a 300 cm$^3$ glass reactor provided with a nitrogen inlet and provided with an anchor-type stirrer equipped with a mechanical stirrer motor which makes it possible to measure the torque. The reactor, under nitrogen, is immersed in an oil bath held at 240° C. and stirring is begun at 250 revolutions/minute. The reactor is progressively placed under vacuum until a vacuum of 0.5 mm Hg is reached and the development in the torque is then observed. The time from which a clear-cut increase in the torque is observed is 55 minutes. The reaction is continued for 17 minutes. The polymer obtained has an inherent viscosity of 0.99 and a melting temperature of 195.5° C.

Comparative Example 10

The reaction is carried out in the same PA 6 diacid oligomer, 23.58 g of the same polyethylene glycol and 0.24 g of $Zr(OBu)_4$ being introduced into the reactor. The time from which a clear-cut increase in the torque is observed is 70 minutes. The reaction is continued for 10 minutes. The polymer obtained has an inherent viscosity of 1.05 and a melting temperature of 202.5° C.

Example 11

27.36 g of a PA 12 diacid oligomer with an Mn equal to 1500 and composed of units resulting from dodecalactam and from the adipic acid chain-limiter, 21.22 g of a polyethylene glycol polyether oligomer with an Mn equal to 1490 (PEG from the company BASF), 1.46 g of a polyoxypropylenediamine oligomer with an Mn equal to 410 (JEFFAMINE D 400 from the company Texaco), i.e. 6.44 weight % with respect to the total polyether charge, and 0.25 g of catalyst $Zr(OBu)_4$, i.e. 0.5 mass % with respect to the total charge, are introduced into the reactor described in Example 9. The reactor, under nitrogen, is immersed in an oil bath held at 240° C. and stirring is begun at 250 revolutions/minute. The reactor is progressively placed under vacuum until a vacuum of 0.5 mm Hg is reached and the development in the torque is then observed. The time from which a clear-cut increase is continued for 5 minutes.

TABLE 1

| Example | PA diacid (Nature/Mn) | Chain-limiter (Dodecane-dioic acid) | PPG | JEFFAMINE | Ratio of JEFFAMINE to [PPG + JEFFAMINE] (weight %) | T1 Mn |
| --- | --- | --- | --- | --- | --- | --- |
| 1 | 6/2300 | DDA | 600 | D 2000 | 10 | 60 |
| 2 | 6/2300 | DDA | 600 | D 2000 | 20 | 40 |
| 3 | 6/2300 | DDA | 600 | D 2000 | 30 | 90 |
| 4 | 6/2300 | DDA | 600 | D 2000 | 50 | 100 |
| 5 | 6/2300 | DDA | 600 | — | 0 | 110 |
| 6 | 6/2300 | DDA | — | D 2000 | 100 | 120 |
| 7 | 6/2300 | DDA | 600 | D 400 | 20 | — |
| 8 | 6/2300 | DDA | 600 | — | 100 | — |

Example 9

30.31 g of a PA 6 diacid oligomer with an Mn equal to 1500 and composed of units resulting from caprolactam and from adipic acid chain-limiter, 16.17 g of a polyethylene glycol polyether oligomer with an equal to 1490 (PEG from the company BASF) 3.43 g of a polyoxypropylenediamine oligomer with an Mn equal to 410 (JEFFAMINE D 400 from the company Texaco), i.e. 17.5 weight % with respect to the The polymer obtained has an inherent viscosity of 1.18 and a melting temperature of 156.1° C.

Comparative Example 12

The reaction is carried out in the same way as in Example 9, 25.00 g of the same PA 6 diacid oligomer, 24.23 g of the same polyethylene glycol and 0.25 of $Zr(OBu)_4$ being introduced into the reactor. The time from which a clear-cut increase in the torque is observed is 30 minutes. The reaction is continued for 5 minutes. The polymer obtained has an inherent viscosity of 1.18 and a melting temperature of 156.8° C.

Example 13

1164.8 g of a PA 6 diacid oligomer with an Mn equal to 2500 and composed of units resulting from caprolactam and from the adipic acid chain-limiter, 268.16 g of a polypropylene glycol polyether oligomer with an Mn equal to 900, 67.04 g of a polyoxypropylenediamine oligomer with an Mn equal to 410 (JEFFAMINE D 400 from the company Texaco), i.e. 20 weight % with respect to the total polyether charge, and 2.25 g (i.e. 0.15%) of antioxidizing agent Irganox 1010 are introduced into a 6 litre stainless steel autoclave. The reactor is kept under nitrogen and brought to the reaction temperature, i.e. 240° C., over a half-hour with stirring (60 revolutions/minute). The reactor is then placed under vacuum until a pressure of 0.5 mm Hg is reached and 15 g of catalyst $Zr(OBu)_4$ are introduced. The rise in viscosity of the polymer is observed, at the end of 2 h 20 minutes after placing under vacuum, through the electrical power transmitted to the stirrer shaft. The development in the torque is then monitored while reducing the stirring to 10 revolutions/minute. The reaction is halted 1 h 40 minutes later and the power displayed at 10 revolutions/minute is recorded as 20% (in % of an arbitrary scale taken as reference). The reactor is then again placed under nitrogen at atmospheric pressure and the polymer is extruded. The polymer obtained has an inherent viscosity of 0.93 and a melting temperature of 208.3° C.

Comparative Example 14

The reaction is carried out in the same way as in Example 13 with the following charges: 11.02.09 g of the same PA 6 diacid oligomer, 392.96 g of the same polypropylene glycol oligomer, 2.24 g of Irganox 1010 and 15 g of catalyst $Zr(OBu)_4$.

The beginning of the rise in viscosity of the polymer is only observed at the end of 4 hours after placing the reactor under vacuum. 2 hours after this beginning of the rise in viscosity, only a value of 10% of the power displayed at 10 revolutions/minute is obtained. The reaction is then halted because no further significant development is recorded. The polymer obtained has an inherent viscosity of 0.78 and a melting temperature of 211.7° C.

Example 15

46.27 g of a PA 6 diacid oligomer with an Mn equal to 2500 and composed of units resulting from caprolactam and from the adipic acid chain-limiter and 2.00 g of a polyoxypropylenediamine oligomer with an Mn equal to 470 (JEFFAMINE D 400 from the company Texaco) are introduced into the reactor described in Example 9. The reactor, under nitrogen, is immersed in an oil bath held at 240° C. and stirring is begun at 250 revolutions/minute. After 30 minutes, 8.02 g of a polypropylene glycol polyether oligomer with an Mn equal to 600 are introduced and the reaction is allowed to continue for 30 minutes. Under these conditions, the polyoxypropylenediamine oligomer content is 19.9 weight % with respect to the polyether charge. The reactor is then progressively placed under vacuum until a vacuum of 0.5 mm Hg is reached and 0.28 g of catalyst $Zr(OBu)_4$, i.e. 0.5 weight % with respect to the charge in the reactor, is introduced. The development in the torque is then observed. A clear-cut increase in the torque is observed 100 minutes after introduction of the reactor into the oil bath. The increase in the viscosity of the reaction mixture requires a successive reduction in the stirring rate of 125, 60 and 15 revolutions/minute. After 180 minutes at 240° C., the reaction is halted. The reactor is again placed at atmospheric pressure under a stream of nitrogen. The polymer obtained has an inherent viscosity of 1.02.

Comparative Example 16

The reaction is carried out in the same way as in Example 15, the polyoxypropylenediamine oligomer with an Mn equal to 470 (JEFFAMINE D 400 from the company Texaco) being replaced by a polytetramethylene glycol oligomer with an Mn equal to 650 (19.9 weight % of the polyether charge). The raw material charges are the following:

45.69 g of the PA 6 diacid oligomer with an Mn equal to 2500, 2.12 g of a polytetramethylene glycol polyether oligomer with an Mn equal to 650, 8.49 g of the polypropylene glycol polyether oligomer with an Mn equal to 600, 0.28 g of catalyst $Zr(OBu)_4$.

A clear-cut increase in the torque is observed 200 minutes after introduction of the reactor into the oil bath. The increase in the viscosity of the reaction mixture requires a successive reduction in the stirring rate of 125 and 60 revolutions/minute. After 360 minutes at 240° C., the reaction is halted. The reactor is again placed at atmospheric pressure under a stream of nitrogen. The polymer obtained has an inherent viscosity of 0.81.

Table 2 summarizes the operating conditions of Examples 9 to 16.

TABLE 2

| Example | PA diacid (Nature/Mn) | Chain-limiter (Adipic acid) | Dihydroxypolyether(s) (Nature/Mn) | Polyetherdiamine (JEFFAMINE) | Ratio of JEFFAMINE to [Polyether + JEFFAMINE] (weight %) |
|---|---|---|---|---|---|
| 9 | 6/1500 | AA | PEG/1490 | D 400 | 17.5 |
| 10 | 6/1500 | AA | PEG/1490 | — | 0 |
| 11 | 12/1460 | AA | PEG/1490 | D 400 | 6.44 |
| 12 | 6/1500 | AA | PEG/1490 | — | 0 |
| 13 | 6/2500 | AA | PPG/900 | D 400 | 20 |
| 14 | 6/2500 | AA | PPG/900 | — | 0 |
| 15 | 6/2500 | AA | PPG/900 | D 400 | 20 |

TABLE 2-continued

| Example | PA diacid (Nature/Mn) | Chain-limiter (Adipic acid) | Dihydroxypoly-ether(s) (Nature/Mn) | Polyether-diamine (JEFFAMINE) | Ratio of JEFFAMINE to [Polyether + JEFFAMINE] (weight %) |
|---|---|---|---|---|---|
| 16 | 6/2500 | AA | PPG/900 PTMG/650 (80/20 by weight) | — | 0 |

Figure 2:
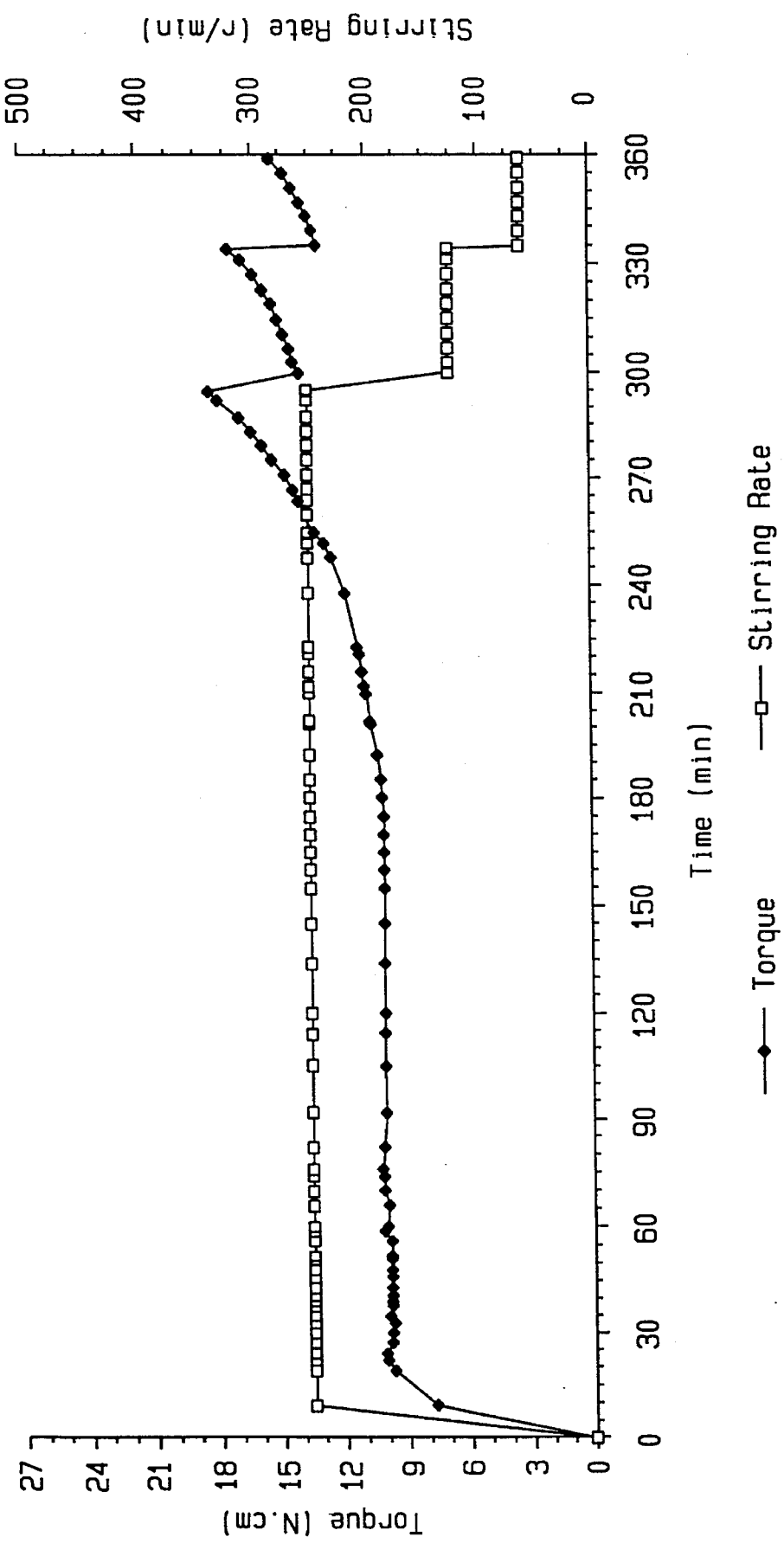
FIG. 2 is a plot of the development in torque and stirring rate as a function of the duration of reaction for an example representative of the prior art.

FIG. 1 is a plot of the stirring rate and torque against time for the reaction as experienced in Example 15. FIG. 2 is a plot of the stirring rate and torque against time for the reaction as experienced in Comparative Example 16. The plots makes it possible to visualize the development in the torque and in the stirring rate as a function of the duration of the reaction. As graphically demonstrated by FIGS. 1 and 2, reaction in accordance with conventional procedures results in a torque increase—indicative of polycondensation—only after 200 minutes, while a similar reaction conducted in accordance with the present invention results in a torque increase after only 100 minutes. This reduction in polycondensation time limits degradation reactions of the polyether oligomers or segments that form part of the desired polyetheresteramides.

What is claimed is:

1. Polyetheresteramides, characterized in that they comprise both of the following repeating entities:

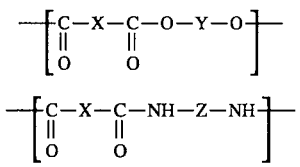

in which X represents the residue of a polyamide-diacid oligomer with an Mn of between 300 and 8000, Y represents the residue of a polyetherdiol with an Mn of between 200 and 5000, Z represents the residue of a polyetherdiamine with an Mn of between 200 and 5000.

2. Polymer according to claim 1, characterized in that the proportion by mass of the entities Z resulting from the condensation of the polyetherdiamine with respect to the total amount of the entities resulting from the polyetherdiol and polyetherdiamine, i.e. Z/(Z+Y), is between 1 and 50%.

3. Polymer according to claim 1, characterized in that the proportion by mass of the polyamide-diacid oligomer is between 10 and 99% with respect to the polymer.

4. Polymer according to claim 1, characterized in that the proportion by mass of the entities Z resulting from the condensation of the polyetherdiamine with respect to the total amount of the entities resulting from the polyetherdiols and polyetherdiamines, i.e. Z/(Z+Y), is between 10 and 20%.

5. Polymer according to claim 1, characterized in that the polyamide-diacid oligomers are obtained by polymerization of lactams and/or amino acids and optionally up to 50 weight % of one or a number of diacids and of one or a number of diamines in the presence of a diacid chain-limiter.

6. Polymers according to claim 1, characterized in that the polyetherdiols and polyetherdiamines are chosen from PEG, PPG, PTMG, or their diamino analogues.

7. Polymer according to claim 1, characterized in that the polyetherdiol is polypropylene glycol.

8. Polymer according to claim 1, characterized in that the polyetherdiamine is polyoxypropylenediamine.

9. Process for the preparation of the polyetheresteramides of claim 1, characterized in that the polyamide-diacid oligomer and the polyetherdiol and polyetherdiamine oligomers are reacted, in the molten state, in the presence of at least one esterification catalyst under reduced pressure.

10. Polyetheresteramides, characterized in that they comprise both of the following repeating entities:

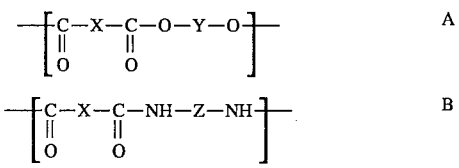

in which
X represents the residue of a polyamide-diacid oligomer with an Mn of between 300 and 8000,
Y represents the residue of a polyetherdiol with an Mn of between 200 and 5000, and
Z represents the residue of a polyetherdiamine with an Mn of between 200 and 5000,
wherein the proportion by mass of the entities Z resulting from the condensation of the polyetherdiamine with respect to the total amount of the entities resulting from the polyetherdiol and polyetherdiamine, i.e. Z/(Z+Y), is between 1 and 50%.

11. A polyetheresteramide according to claim 10 in which Z/(Z+Y) is between 5 and 30%.

12. A polyetheresteramide according to claim 11, wherein the proportion by mass of the entities Z resulting from the condensation of the polyetherdiamine with respect to the total amount of the entities resulting from the polyetherdiols and polyetherdiamines, i.e. Z/(Z+Y), is between 10 and 20%.

13. A polyetheresteramide according to claim 10, wherein the proportion by mass of the polyamide-diacid oligomer is between 10 and 99% with respect to the polymer.

14. A polyetheresteramide according to claim 13, wherein the proportion by mass of the polyamide-diacid oligomer is between 20 and 95% with respect to the polymer.

15. A polyetheresteramide according to claim 14, wherein the proportion by mass of the polyamide-diacid oligomer is between 40 and 90% with respect to the polymer.

16. A polyetheresteramide according to claim 10 in which
X represents the residue of a polyamide-diacid oligomer with an Mn of between 500 and 5000,
Y represents the residue of a polyetherdiol with an Mn of between 200 and 3000, and
Z represents the residue of a polyetherdiamine with an Mn of between 200 and 3000.

17. A polyetheresteramide according to claim 10, wherein X comprises the polymerization product of one or more monomers selected from the group consisting of lactams and amino acids in the presence of a diacid chain-limiter.

18. A polyetheresteramide according to claim 17, wherein X comprises the polymerization product of caprolactam in the presence of a chain-limiter selected from the group consisting of adipic acid and dodecanedioic acid.

19. A polyetheresteramide according to claim 17 in which X comprises the polymerization product of a mixture comprising one or more monomers selected from the group consisting of lactams and amino acids and up to 50 weight % additional monomers selected from the group consisting of one or more diacids and of one or more diamines.

20. A polyetheresteramide according to claim 10, wherein the polyetherdiols are selected from the group consisting of polyethylene glycol, polypropylene glycol, and polytetramethylene glycol oligomers and the polyetherdiamines are independently chosen from the diamino analogues of said oligomers.

21. A polyetheresteramide according to claim 20, wherein the polyetherdiol is polypropylene glycol and the polyetherdiamine is polyoxypropylenediamine.

22. A process for the preparation of the polyetheresteramides of claim 10 which comprises reacting a reaction mixture comprising polyamide-diacid oligomer, polyetherdiol oligomer, and polyetherdiamine oligomer, under reduced pressure and in the molten state, in the presence of at least one esterification catalyst.

23. A process as in claim 22, wherein the reaction mixture further comprises a chain-limiter.

24. A process as in claim 23, wherein the reaction is conducted at a temperature between 200° and 400° C.

25. A process as in claim 24, wherein the reaction is halted immediately after the passage of a period of time that is less than the period of time necessary for the commencement of significant polycondensation in a corresponding reaction mixture that lacks polyetherdiamine oligomer.

26. A polyetheresteramide as in claim 10 that is substantially free from degradation products.

* * * * *